United States Patent [19]

Sato

[11] Patent Number: 4,788,828
[45] Date of Patent: Dec. 6, 1988

[54] CONTROL DEVICE FOR USE IN A REFRIGERATION CIRCUIT

[75] Inventor: Motoharu Sato, Honjo, Japan

[73] Assignee: Sanden Corporation, Gunma, Japan

[21] Appl. No.: 147,304

[22] Filed: Jan. 22, 1988

[30] Foreign Application Priority Data

Feb. 16, 1987 [JP] Japan .................. 62-9889[U]

[51] Int. Cl.$^4$ ............................................. F25B 41/04
[52] U.S. Cl. ........................................ 62/214; 62/222; 236/93 A
[58] Field of Search ............... 62/222, 214, 210, 209, 62/204; 236/93 A

[56] References Cited

U.S. PATENT DOCUMENTS

| | | | |
|---|---|---|---|
| 1,704,522 | 3/1929 | Troup | 62/204 |
| 1,985,134 | 12/1934 | Yount | 62/222 |
| 2,481,968 | 9/1949 | Atchison | 62/222 |
| 3,037,362 | 6/1962 | Talney et al. | 62/222 X |
| 3,367,130 | 2/1968 | Owens | 62/222 |
| 3,482,415 | 12/1969 | Trask | 62/222 |
| 3,564,865 | 2/1971 | Spencer et al. | 62/197 |
| 4,145,163 | 3/1979 | Fogelberg et al. | 417/222 |
| 4,254,634 | 3/1981 | Akio et al. | 62/222 X |
| 4,429,552 | 2/1984 | Reedy | 62/528 |
| 4,633,674 | 1/1987 | Sato | 62/197 |
| 4,679,727 | 7/1987 | Alesson | 236/93 A X |

Primary Examiner—William E. Tapolcai
Attorney, Agent, or Firm—Banner, Birch, McKie & Beckett

[57] ABSTRACT

A refrigeration circuit including a compressor, a condenser, a control device, an evaporator and an accumulator is disclosed. The elements are serially arranged with the control device located between the outlet of the condenser and the inlet of the evaporator. The control device includes a tubular casing having three spaced walls on its interior surface. The first wall includes a plurality of holes and has a bellows attached to the interior surface thereof, the second wall has a longitudinal bore and a parallel bypass hole therethrough, and the third wall includes an orifice. An operating valve is mounted on the opposite end of the bellows. The bellows expands and contracts in accordance with the temperature of refrigerant fluid and the outlet side of the condenser, thereby, moving the operating valve to the left or the right. Movement of the operating valve controls the open cross-sectional area of the longitudinal bore so that the flow volume of refrigerant fluid in the circuit may be controlled.

4 Claims, 2 Drawing Sheets

CONTROL DEVICE FOR USE IN A REFRIGERATION CIRCUIT

BACKGROUND OF THE INVENTION

1. Field of the Invention

This invention relates to a control device for use in a refrigeration circuit, and more particularly, to a device for controlling the flow volume of refrigerant in a refrigeration circuit.

2. Description of the Prior Art

FIG. 1 shows a conventional refrigeration circuit for use, for example, in an automotive air conditioning system. The circuit includes compressor 1, condenser 2, receiver dryer 3, expansion device 4, and evaporator 5 serially connected. The output of evaporator 5 is also connected to the input of compressor 1.

Expansion device 4 is a thermostatic expansion valve which is utilized in the circuit to both expand and control the flow volume of the refrigerant. The operation of expansion valve 4 is dependent upon the degree of superheating of the refrigerant at the outlet side of evaporator 5. The refrigeration circuit is usually operated within a range of five to eight degrees of the temperature at superheating to minimize the loss in compressor efficiency and to simultaneously avoid damaging the valves of compressor 1 caused by intake of refrigerant in the liquid state.

If the refrigeration circuit is utilized in an automotive air conditioning system, the flow volume of the refrigerant changes greatly in accordance with the change in the rotation speed of the engine. As a result, liquid refrigerant may be returned to the suction side of compressor 1 without changing state. Also, if there is a low flow volume, hunting phenomenon may occur.

FIG. 2 shows a second conventional refrigeration circuit including compressor 1a, condenser 2a, expansion device 6, evaporator 5a, and accumulator 7 serially connected. Expansion device 6 may be a capillary. Since the outlet of evaporator 5a is connected to the inlet of accumulator 7, the degree of superheating required at the outlet side of evaporator 5a to prevent liquid refrigerant from entering compressor 1 is near zero. Therefore, the heat exchange efficiency of evaporator 5a is greatly improved. However, if there is a low or medium refrigerant flow voluem, liquid refrigerant may be accumulated in accumulator 7 and may be intaken by compressor 1a. If in the alternative there is a high refrigerant flow volume, liquid refrigerant may accumulate in condenser 2a, reducing the capacity thereof. Therefore, the liquid refrigerant accumulated in accumulator 7a will become insufficient for operation of the system. As a result, the degree of superheating of the refrigerant needed at the outlet side of evaporator 5a increases abnormally requiring accumulator 7 to be enlarged in order to maintain sufficient volume of liquid refrigerant in the circuit.

SUMMARY OF THE INVENTION

It is an object of this invention to provide an improved refrigeration circuit including a control device to control the flow volume of refrigerant in a refrigeration circuit.

It is also an object of this invention to provide a refrigeration circuit which is easily interchanged with a conventional refrigeration circuit.

These and other objects are accomplished by providing a refrigeration circuit including a compressor, a condenser, a control device, an evaporator and an accumulator. The elements are serially connected and refrigerant discharged from the outlet of the compressor circulates through each element and returns to the inlet of the compressor. The control device includes a tubular casing with three walls disposed on its interior surface. The walls are fixed a predetermined distance apart. The first wall includes a plurality of holes and a projecting portion and the second wall includes a longitudinal bore and a bypass hole parallel thereto. The third wall has an orifice. A bellows is mounted at one end on the terminal end of the projecting portion of the first wall and extends therefrom into a chamber between the first and second walls. The bellows expands or contracts in accordance with the temperature of the refrigerant in the chamber. At its other end, the bellows includes an operating valve for controlling the flow of refrigerant through the longitudinal bore of the second wall. In a second embodiment, a bypass hole is formed along the circumference of the longitudinal bore to prevent the operating valve from entirely closing the longitudinal bore even when the bellows is in its fully extended position.

Further objects, features and other aspects of this invention will be understood from the following detailed description of the preferred embodiment of this invention and the drawings.

DETAILED DESCRIPTION OF PREFERRED EMBODIMENTS

Figure 1:
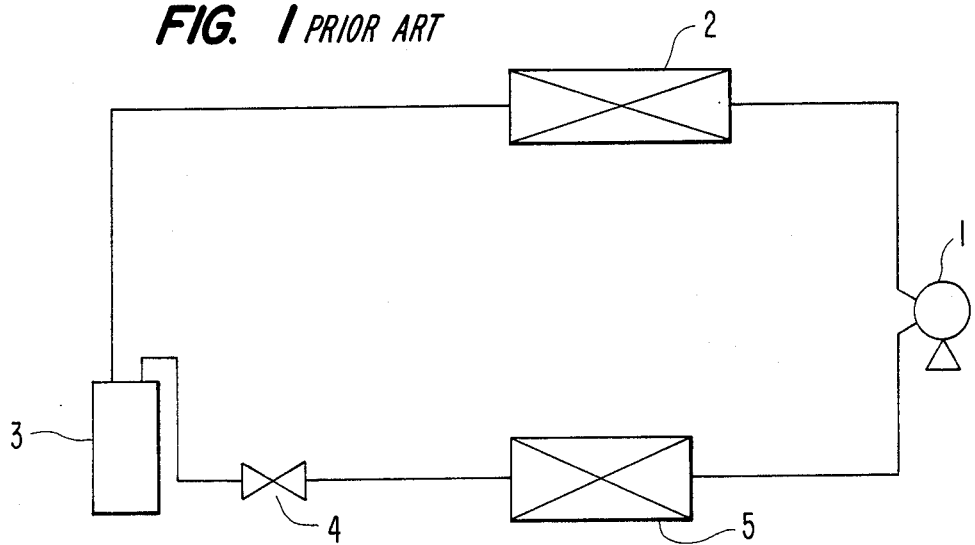
FIG. 1 is a schematic diagram of a conventional refrigeration circuit.
Figure 2:
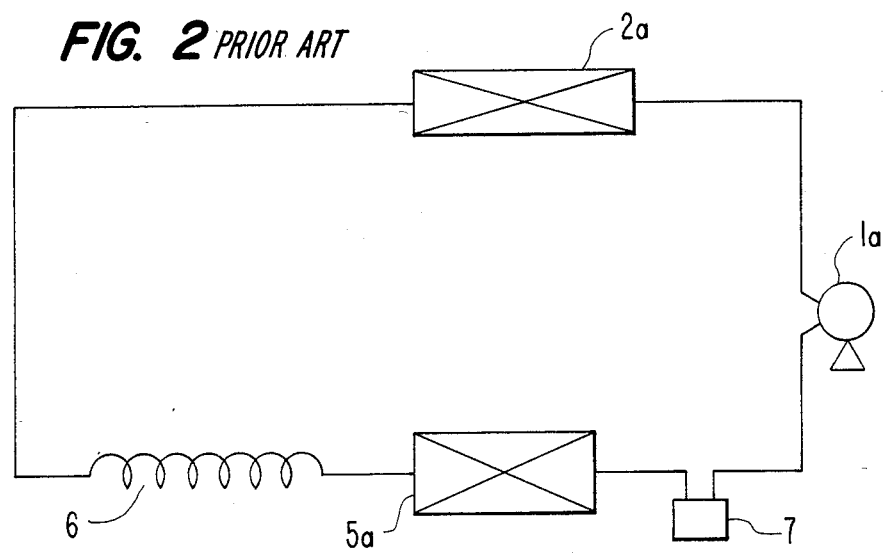
FIG. 2 is a schematic diagram of a second conventional refrigeration circuit.
Figure 3:
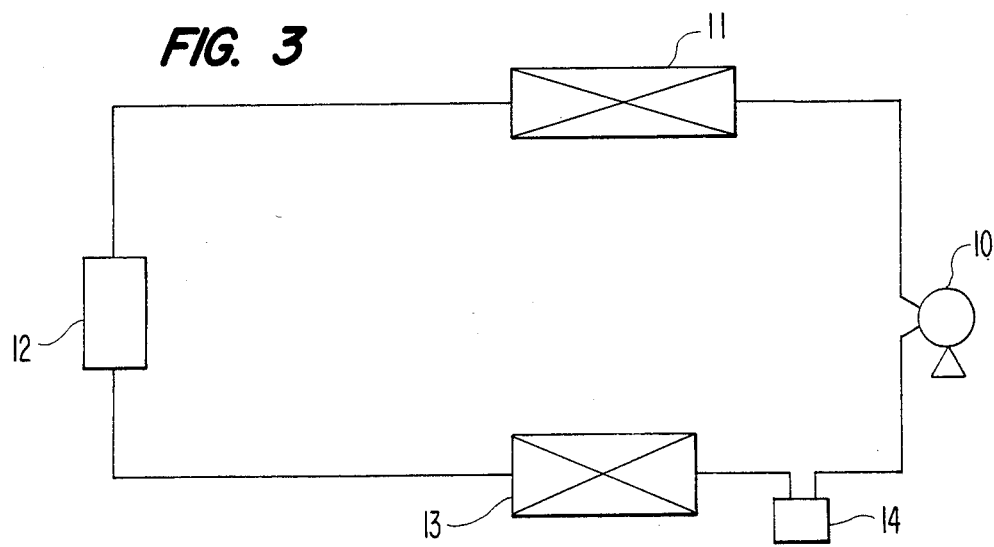
FIG. 3 is a schematic diagram of a refrigeration circuit in accordance with the present invention.

FIG. 3 shows a refrigeration circuit according to the present invention for use in an automotive air conditioning system and including a control device in accordance with the invention. The refrigeration circuit includes compressor 10, condenser 11, control device 12, evaporator 13, and accumulator 14 serially connected. The inlet of condenser 11 is connected to the outlet port of compressor 10 and the outlet of condenser 11 is connected to the inlet of control device 12. The outlet of control device 12 is connected to the inlet of evaporator 13 and the outlet of evaporator 13 is coupled to the inlet port of compressor 10 via accumulator 14.

Figure 4:
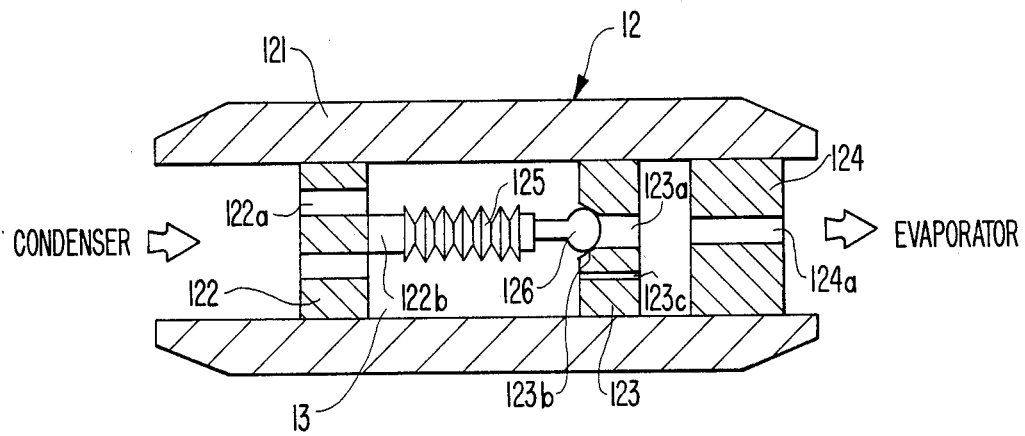
FIG. 4 is a cross-sectional view of a first embodiment of the control device used in the refrigeration circuit of FIG. 3.

FIG. 4 shows the construction of control device 12 in accordance with a first embodiment of this invention. Control device 12 includes tubular casing 121, first wall 122, second wall 123 and third wall 124. The three walls are disposed on the interior surface of tubular casing 121 at a predetermined distance apart. First interior chamber 13 is formed between first wall 122 and second wall 123. Second interior chamber 14 is formed between second wall 123 and third wall 124. First wall 122 includes a pair of holes 122a through which refrigerant flows in the direction of the arrow. Second wall 123 includes longitudinal bore 123a having valve seat 123b on its side facing first wall 122 and bypass hole 123c. Longitudinal bore 123a and bypass hole 123c extend through second wall 123 and are parallel. The cross-sectional area of bypass hole 123c is less than the cross-sectional area of longitudinal bore 123a. Third wall 124 includes orifice 124a formed therethrough at a central region.

Shank portion 122d extends from the interior side of first wall 122 into chamber 13. Bellows 125 is mounted on the terminal end of shank portion 122b and has at its other end operating valve 126 which sealingly engages with valve seat 123b when bellows 125 is extended. Bellows 125 contains refrigerant fluid which is maintained in a saturated state. Bellows 125 is made of a material which has a high thermal conductivity.

In operation, when compressor 10 is driven, refrigerant fluid in the refrigeration circuit flows into first chamber 13 through holes 122a of first wall 122. Bellows 125 is responsive to the temperature of the refrigerant flowing into first chamber 13 and expands or contracts moving operating valve 126 to the right or left. Since movement of the operating valve is dependent upon the temperature of the refrigerant fluid in bellows 125, the pressure of the refrigerant within bellows 125 is balanced with the pressure of refrigerant in first chamber 13 and bellows 125 moves accordingly to maintain the balance. Movement of bellows 125 controls the degree to which valve seat 123b is open to thereby control the flow volume of refrigerant fluid through longitudinal bore 123a. Even when bellows 125 is fully extended so that operating valve 126 fully closes longitudinal bore 123a, bypass hole 123c is always open insuring that at least a minimum volume of refrigerant fluid in first chamber 13 flows into second chamber 14. Therefore, the minimum volume of refrigerant which is necessary to maintain the subcooling operation of control device 12 is always available. Furthermore, the provision of bypass hole 123c prevents the occurrence of hunting.

Figure 5A:
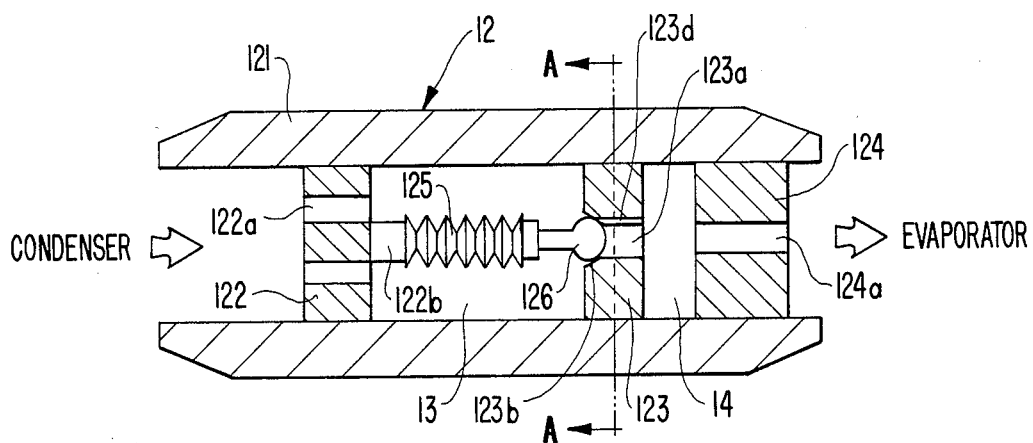
FIG. 5a is a cross-sectional view of a second embodiment of the control device used in the refrigeration circuit of FIG. 3.
Figure 5B:
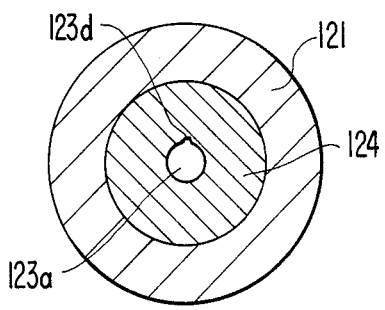
FIG. 5b is a cross-sectional view of the control device shown in FIG. 5a taken A—A.

FIGS. 5a and 5b show a second embodiment of the control device according to the present invention in which the same reference numerals used in FIG. 4 will be used for the same elements. In control device 12, separate bypass hole 123c is eliminated and is replced by bypass hole 123d formed along the surface of longitudinal bore 123a. Bypass hole 123d and longitudinal bore 123a form a region with a common cross-section as shown in FIG. 5b. Therefore, even when bellows 125 is fully expanded so that operating valve 126 fully seals longitudinal bore 123a, bypass hole 123d remains open since operating valve 126 is not large enough to seal it as well. Thus, the refrigerant fluid in first chamber 13 flows through bypass hole 123d into second chamber 14 accomplishing the same results as described in the first embodiment.

This invention has been described in detail in connection with the preferred embodiments. The preferred embodiments however are merely for example only and this invention is not restricted thereto. It will be understood by those skilled in the art that variations and modifications can be easily made within the scope of this invention as defined by the appended claims.

I claim:

1. A refrigeration circuit comprising a compressor, a condenser, a control device, an evaporator, and an accumulator serially arranged to form a closed refrigerant circulation path, said control device comprising:
   a tubular casing;
   a first, second and third wall disposed on an interior surface of said tubular casing, said first wall having a plurality of holes therethrough, said second wall spaced from said first wall and having a longitudinal bore and a parallel bypass hole therethrough, and said third wall spaced from said second wall and having an orifice therethrough;
   and a bellows connected to said first wall and disposed in the region between said first wall and said second wall and having an operating valve at its opposite end for controlling the flow of refrigerant through said longitudinal bore in said second wall in response to movement of said bellows.

2. The refrigeration circuit of claim 1 wherein said bellows contains a saturated fluid, and said bellows expands or contracts in response to the temperature of the refrigerant in the refrigeration circuit at the outlet side of said condenser.

3. The refrigeration circuit of claim 2 wherein said bypass hole is formed as a groove on the circumference of said longitudinal bore.

4. The refrigeration circuit of claim 1 wherein said bypass hole is formed as a groove on the circumference of said longitudinal bore.

* * * * *